June 17, 1941.    J. C. DRADER    2,245,907
CUTTING MACHINE
Filed April 9, 1934    8 Sheets-Sheet 1

INVENTOR.
Joseph C. Drader.
BY
Harness, Dickey, Pierce & Hanna.
ATTORNEYS.

June 17, 1941.   J. C. DRADER   2,245,907
CUTTING MACHINE
Filed April 9, 1934   8 Sheets-Sheet 5

INVENTOR.
Joseph C. Drader.
BY
Harness, Dickey, Pierce & Hann.
ATTORNEYS.

June 17, 1941.  J. C. DRADER  2,245,907
CUTTING MACHINE
Filed April 9, 1934  8 Sheets-Sheet 6

INVENTOR.
Joseph C. Drader.
BY
Harness, Dickey, Pierce & Hann.
ATTORNEYS.

Patented June 17, 1941

2,245,907

UNITED STATES PATENT OFFICE 2,245,907

CUTTING MACHINE

Joseph C. Drader, Detroit, Mich.

Application April 9, 1934, Serial No. 719,646

6 Claims. (Cl. 90—4)

My invention relates to machines and particularly to a machine for accurately finishing worm gear elements to be in surface-mated relation.

The present invention deals with a machine for finishing worm gearing of the globoidal type having threads in surface-mated relation which reduces heat and friction loss and provides long life. Such gear elements and the method of producing the same have been illustrated, described and claimed in the patents to Cone No. 1,683,163, No. 1,751,540, No. 1,822,800, and No. 1,885,686. The present machine is employed primarily for producing a small worm gear unit but it is to be understood that the principles and inventions embodied in the machine are not limited to worm gear elements of a particular size but may be employed on any size of elements. The principles are the same in any instance.

In practicing my invention, I employ a machine having a spindle to receive a gear element and for driving it in rotation in synchronism with the driving of the spindle for the cutting tool or tools, which is a hob in the case of the worm wheel and a cutter in the case of the worm. The tools are first automatically fed into proper depth and thereafter are additionally rotated to effect a side cutting operation on the teeth or thread of the worm elements.

The additional rotation of the hob causes the cutting edge to shift due to the lead of the thread to thereby finish the side of teeth of the worm, while in the case of the worm the additional rotation of the cutter causes the sides of the teeth to be advanced into the thread to thereby finish the sides of the thread to accurate dimensions. It is needless to say that in both instances the teeth of the hob and the cutter are narrower than the width of the ultimate gap to be formed thereby, which is necessary to provide sufficient stock for a dressing operation effected by the additional rotation of the tools.

It is well known that the "in-feeding" of a tooth of a tool into a globoidal worm element will deform the sides of the gaps so that they are not true surfaces and will not mate with the teeth of a worm wheel to provide surface engagement. The additional rotational movement of the tool effects a finishing operation to the thread and teeth sides and is necessary to provide mating surfaces.

The machine is so constructed that the relative rotation of the elements, that between the hob and worm wheel and between the cutters and the worm, can be changed. In the cutting of the worm wheel it is necessary to drive the worm wheel at a low rate of speed relative to the operation of the hob while the reverse is true in the case of the worm which is rotated at high speed and the cutters are rotated at a relative lower speed. The relative rotation, however, is the same and through the interchanging of the driving gears for the tool and work spindles the change in relation of the rotation of the work and tool as specified above, is effected. In this manner, a single machine may be changed over to produce first worms and then worm wheels and if separate worm and worm wheel machines are employed, similar gearing will be provided therein which are interchangeable.

After the work is assembled, the machine is started through the operation of a clutch. The tools and work operate in timed relation and the tools are automatically advanced into the work until a required depth is reached after which the tools are additionally rotated or retarded a predetermined amount to advance the cutting edges into the sides of the grooves formed through the initial advancement of the tools. Thereafter, the tools are automatically drawn apart and away from the work and the machine stopped. Means are provided which permits the stopping of the machine at any point in its cycle of operation and certain adjustments are provided on the machine to permit the tools to be set in aligned relation to each other. The tools are preferably employed one on each side of the gear elements and are rotated to cut on opposite sides of threads being machined. In this manner the torque on the spindles, the work and the tools is balanced and finer machining operations are thereby produced.

Accordingly, the main objects of my invention are to provide a machine which is simple in construction and which automatically feeds one or more tools into the work to a proper depth and to thereafter feed sidewardly to dress the sides of the cut grooves to accurate dimensions, after which the tools are moved away from the work and the machine stopped; to provide a machine having tools on each side of the work elements to be advanced into the work and thereafter operate on opposite sides of the groove to thereby balance the torque produced by the cutting operation; to construct a machine having gears of such relation that they may be interchanged to drive the worm wheel at low speed and the hobbing tools at high speed or the worm at high speed and the cutters at low speed, the high and low speeds being relative; to provide a machine which is completely automatic in operation from the starting to the finishing operation including the movement of the tools away from the work; to provide a base whereon several of the machines may be mounted and operated from a single power source to utilize a single operator for a battery of such machines; and, in general, to provide a machine for finishing the worm elements of globoidal type which is simple in construction, economical of manufacture, which is extremely simple in operation, which machines with a high degree of accuracy, and which machines with extreme rapidity.

Other objects and features of novelty of my invention will be either specifically pointed out or will become apparent when referring, for a better understanding of my invention, to the following description taken in conjunction with the accompanying drawings, wherein:

Fig. 5 is a side view of the structure illustrated in Fig. 4 with parts in section;

Figures 1, 2:
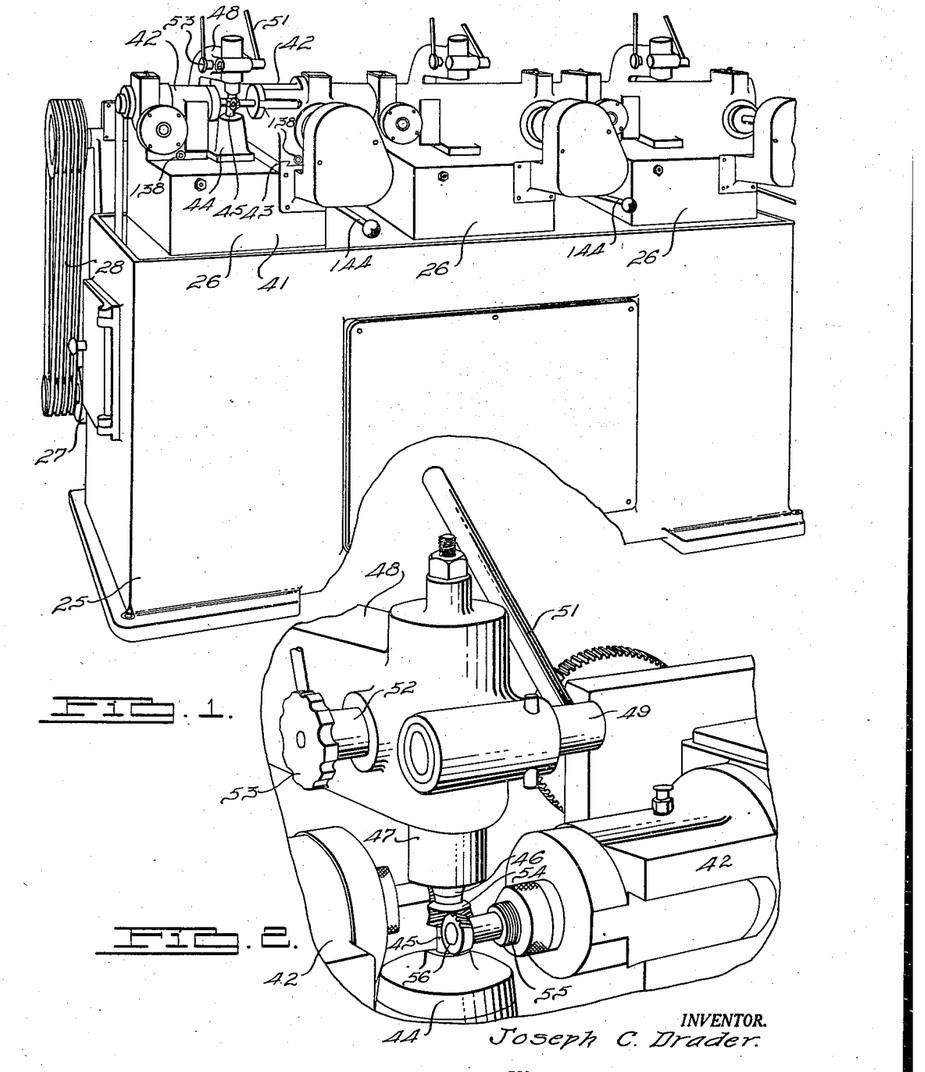
Figure 1 is a perspective view of a base having a plurality of machines embodying my invention mounted thereon driven from a common source.
Fig. 2 is an enlarged broken sectional view of the work spindles and the tools illustrated on the machines of Fig. 1.
Figure 3:
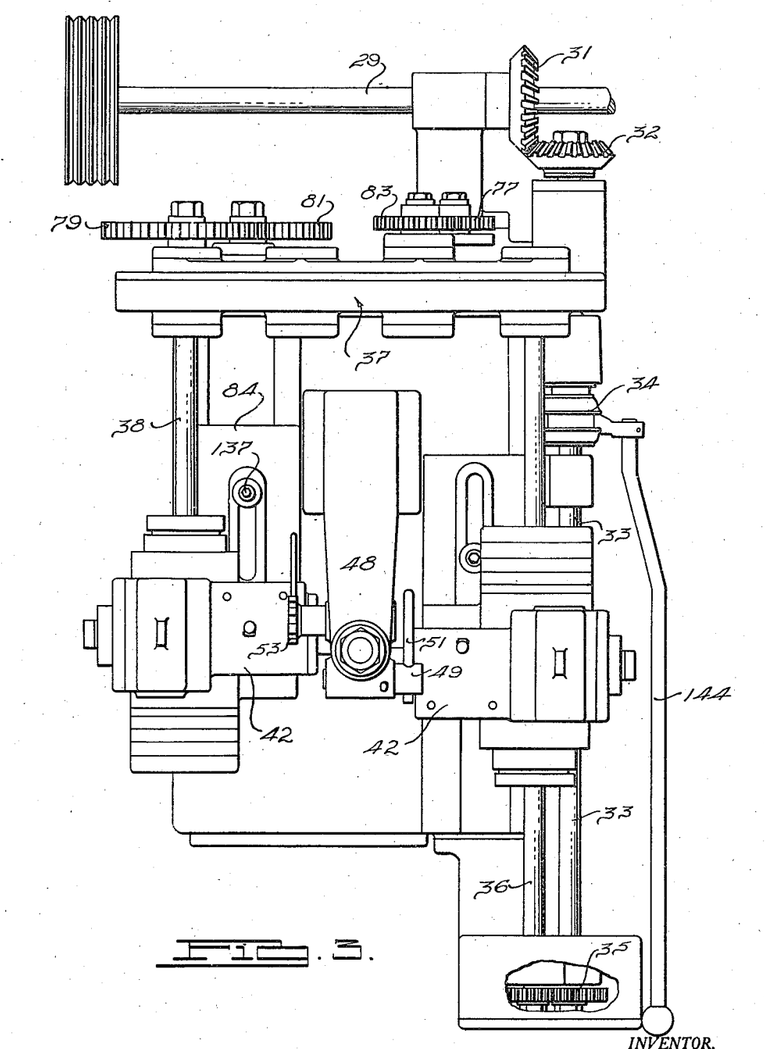
Fig. 3 is an enlarged plan view of one of the machines illustrated in Fig. 1.

In Fig. 1, I have illustrated an elongated base 25 which has three machines 26 mounted thereon to facilitate the operation of a plurality of the machines by a single operator and the driving of the machines by a single motor. The machines 26 are similar and are shown assembled for cutting worms. The machines have been so constructed that very little change is necessary to construct similar machines for cutting the worm wheel. Both types of machines could be mounted on the same base. In this manner, substantially the same castings and driving units are employed and assembled in slightly different manner to provide machines which will cut the different worm gear elements as will be explained fully hereinafter. The machines are operated by a motor 27 which drives the belt and pulleys 28 for operating a shaft 29 which extends along the base to drive each of the machines through a bevel gear 31, as illustrated in Fig. 3. The bevel gear 31 drives a similar gear 32 to operate a shaft 33 in which a clutch 34 is provided. The shaft 33 operates through a pair of driving gears 35 to drive a shaft 36 which operates through a train of gears 37 to operate a shaft 38 in timed relation to the shaft 36.

Each machine 26 is provided with a base 41 in which spindle housings 42 of opposite hand are mounted in ways 43 for movement normal to the spindles. A housing 44 contains a work supporting spindle 45 steadied at its upper end by a rest 46, as illustrated more clearly in Fig. 2, which is mounted in a reciprocable element 47 retained in a support 48. A shaft 49 operated by a handle 51 moves the element 47 in reciprocation and a locking shaft 52 actuated by a handle 53 retains the element 47 in moved position. In Fig. 2, I have illustrated a worm 54 mounted on the spindle 45 and retained by the element 46 in fixed aligned relation. The housings 42 are provided with spindle receiving shafts 55 in which the cutting tools 56 are retained for rotational movement.

Figures 3, 4:
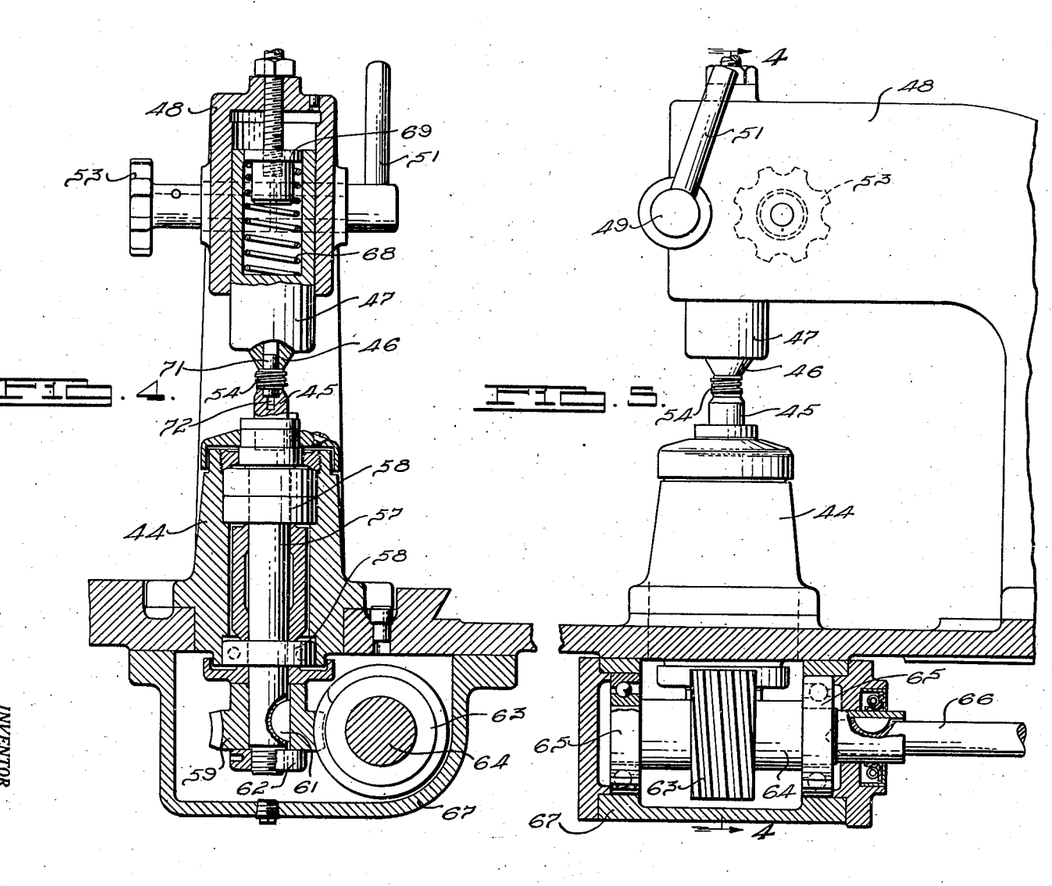
Fig. 4 is an enlarged sectional view of the work spindle illustrated in Fig. 2.

Referring to Figs. 4 and 5, I have illustrated the work supporting structure in section wherein the work receiving spindle 45 is mounted on the end of a shaft 57 which is retained for rotational movement in suitable bearings 58 within the housing 44 having a worm wheel 59 on its lower end secured thereon by a suitable key 61 and nut 62. The worm wheel 59 meshes with a worm 63 which is mounted on a shaft 64.

The shaft 64 is mounted in suitable bearings 65 to be driven by the shaft 66 which is keyed thereto. A suitable casing 67 covers the worm wheel unit and is sealed to retain a lubricant therein. It will be noted that the element 47 is hollow to receive a spring 68 retained by an adjustable stop 69 which may be regulated to adjust the tension on the work-steadying portion 46. The element 46 is hollow to receive the shaft end 71 of the worm 54, the element 45 being likewise recessed and slotted to receive the other shaft end of the worm which is provided with a land which registers in the slot to have the worm 54 driven in synchronism with the rotation of the shaft 57.

Figures 9, 10:
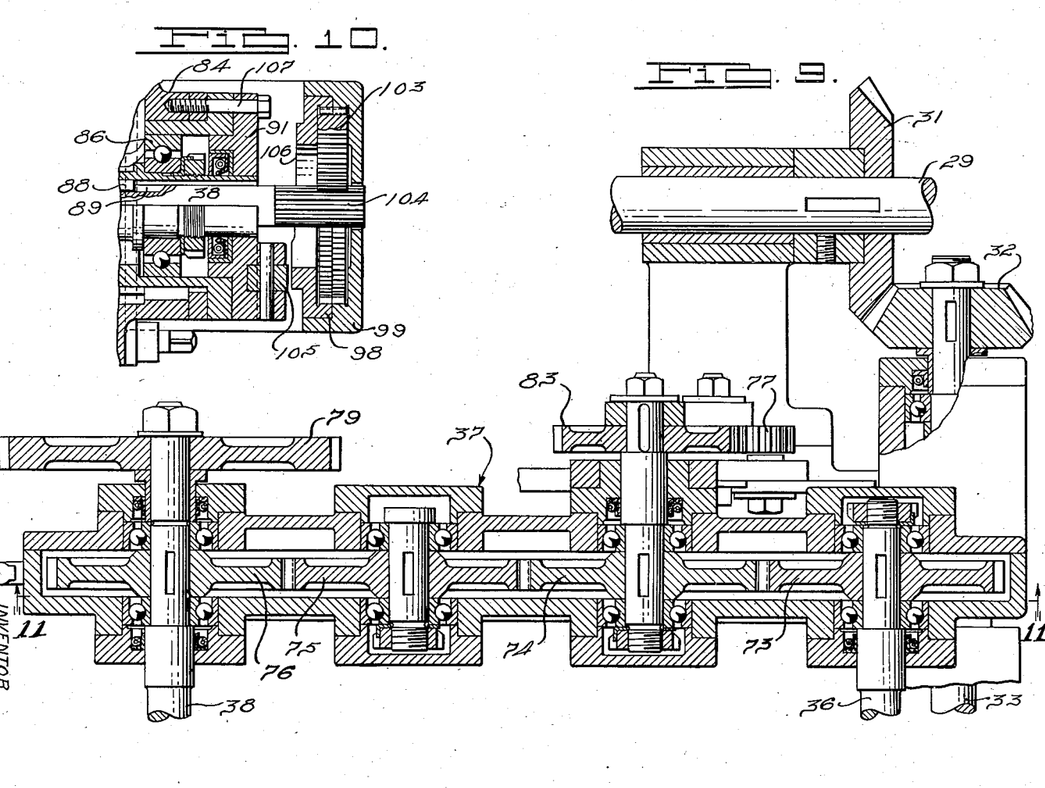
Fig. 9 is a view of gearing for controlling the operation of various elements of the machine, with the supporting portions therefor broken away.
Fig. 10 is a view of a portion of the structure illustrated in Fig. 6, showing a modified form thereof.
Figure 11:
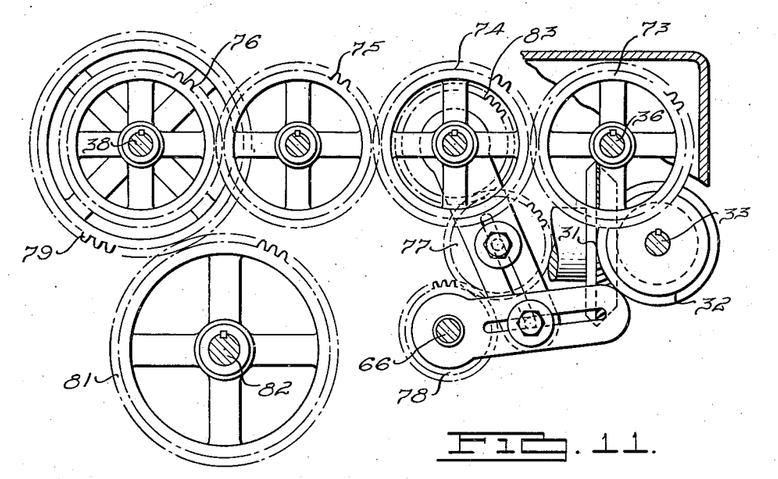
Fig. 11 is a sectional view of the structure illustrated in Fig. 9, taken on the line 11—11 thereof.

The gear train 37 is illustrated enlarged and in section in Figs. 9 and 11 wherein the shaft 36 drives through a gear 73 to operate similar gears 74, 75 and 76, which latter gear drives the shaft 38. The gear 74 drives, through timing gears 83, 77 and 78, the shaft 66 which, as has been pointed out hereinabove, drives the worm 63 of the work-supporting spindle. In this manner the spindle is driven at a predetermined speed relative to the rotation of the tools.

Connected also to the shaft 38 is a gear 79 in mesh with a gear 81 which operates a shaft 82 for effecting the actuation of the spindle housings 44 in reciprocation in a manner which will be explained more fully hereinafter. The shaft supporting the gear 74 operates the timing gear 83 to drive through the idler gear 77, the gear 78 which drives the shaft 66. Through the interchange of the gears 77, 78 and 83 the rotation of the work is regulated in timed relation to the rotation of the cutting tools.

Figure 6:
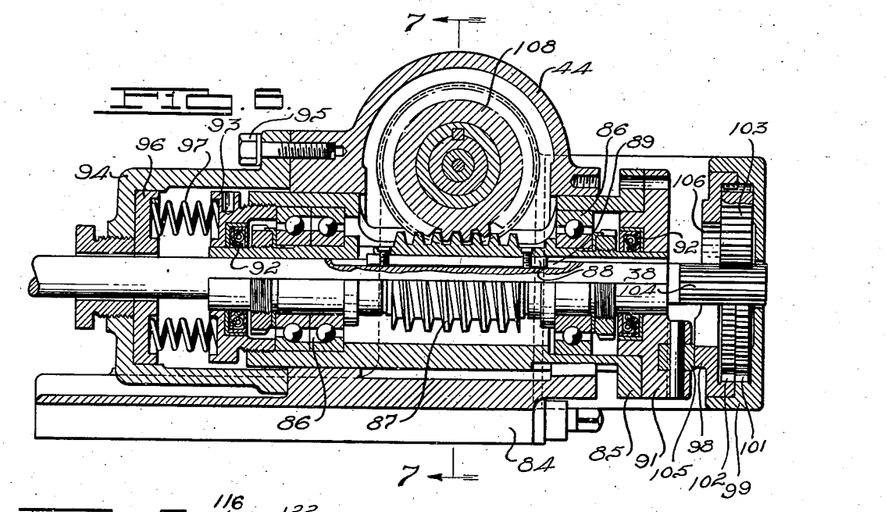
Fig. 6 is a sectional view of the driving means for the tool spindle.
Figures 7, 8:
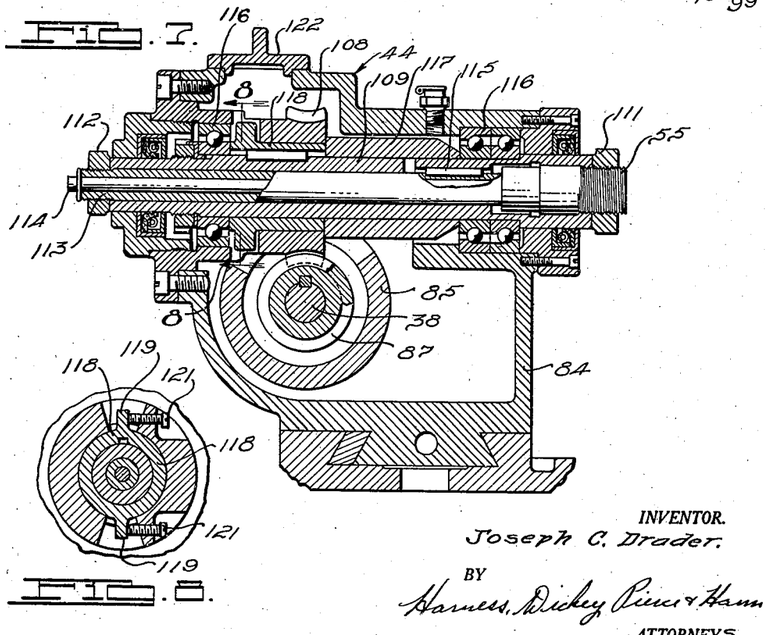
Fig. 7 is a sectional view of the structure illustrated in Fig. 6, taken on the line 7—7 thereof.
Fig. 8 is a sectional view of the structure illustrated in Fig. 7, taken on the line 8—8 thereof.

In Figs. 6, 7 and 8, I have illustrated the tool spindle housings 42 as comprising a dovetailed slide portion 84 carrying a bearing supporting housing 85 in which ball bearings 86 support a hollow worm and shaft 87 which is mounted over the shaft 38. It is to be understood that the same structure as illustrated in Fig. 6, is also provided relative to the shaft 36 which extends beyond both ends of the housing. A key 88 is carried on the inner surface of the hollow worm and shaft 87 which is mated in a keyway 89 provided in the shaft 38 to cause the worm to rotate with the shaft and to be slidable axially thereof. One end of the bearing supporting housing 85 is closed by a cam following plate 91 having sealing element 92 therein while the opposite end is closed by a spring engaging plate 93 likewise having a sealing element 92 therein. In this manner the bearing receiving housing 85 forms a well for retaining a lubricant for lubricating the bearings and the worm elements.

A spring housing 94 is secured over one end of the shaft 38 and supported to the end of the slide housing 84 by suitable bolts 95. The housing 94 retains a spring plate 96 against a plurality of springs 97 which engage the spring plate 95 for forcing the worm and shaft 87 toward a cam 98.

The cam 98 is bearing in a suitable projection portion 99 of the housing 84 having an internal gear 101 formed therein which is of the same diameter as an internal gear 102 formed in the cam 98 having one more or less teeth therein for causing the advancement of the cam due to the operation of a gear 103 which is mated with teeth 104 on the shaft 38. The teeth are so constructed as to provide a ratio of 300 or 400 or more to one. That is to say, the cam 98 will turn once to 300 or 400 revolutions of the shaft 38. The cam plate 91 carries a roller 105 with which the cam surfaces 106 of the cam 98 engage.

As shown in the drawings, the cam has been operated to cause the axial movement of the worm wheel 87 to the left, as viewed in Fig. 6, and as soon as the roller 105 passes over the high portion of the cam, the springs 97 will cause the worm to be moved to the right, all for a purpose which will be explained hereinafter.

In Fig. 10, I have illustrated the same construction as in Fig. 6 with the exception that the cam plate 91 has been drawn into engagement with the housing 84 and retained in firm fixed relation therewith by a plurality of bolts 107. In this construction it will be noted that the roller 105 is disengaged from the high portion of the cam surface 106 of the cam 98 and in this manner the worm and shaft 87 is retained in fixed position out of a position to be operated axially by the cam. Under certain conditions as will be pointed out hereinafter the operation of the machine without the axial movement of the worm 87 may be desired.

In Fig. 8, I have illustrated a section of the structure illustrated in Fig. 6 wherein the worm 87 drives a worm wheel 108 for driving a shaft 109 in rotation. The shaft 109 is hollow and receives the tool holder 55. The tool holder 55 passes entirely through the shaft 109 having a nut 111 on the tool receiving end and nut 112 on the opposite end whereby the projection of the tool from the housing 44 may be regulated. A rod 113 is threaded to the end of the tool and passes through the holder 55 to retain the tool fixed to the holder. A head 114 is provided on the rod by which the rod 113 is turned to draw the tool in firm relation to the holder 55. Suitable ball bearings 116 are provided for supporting the shaft while a key and keyway 115 retains the element 55 in driving relation to the hollow shaft 109. A spacing element 117 is provided on the shaft for positioning the worm wheel 108 thereon against endwise movement. The worm wheel 108, as illustrated in Fig. 8, is mounted on a collar 118 having ears 119 thereon engageable by screws 121 carried by the worm wheel. Through the adjustment of the screws the worm wheel is moved relative to the hollow shaft 109 to adjust the shaft in rotation for positioning the hobs relative to each other and the work. When the cam 98 is not employed, as in the construction illustrated in Fig. 10, the shaft 38 may be split and provided with an adjustable connecting element to provide a greater degree of adjustment to the tools. However, in view of the synchronized relation of the tools and work, this connecting element must be accurately set and not employed when the cam 98 is utilized. A removable cover 122 is provided on the housing to permit access to the screws 121 for effecting the adjustment.

Figures 15, 16, 17:
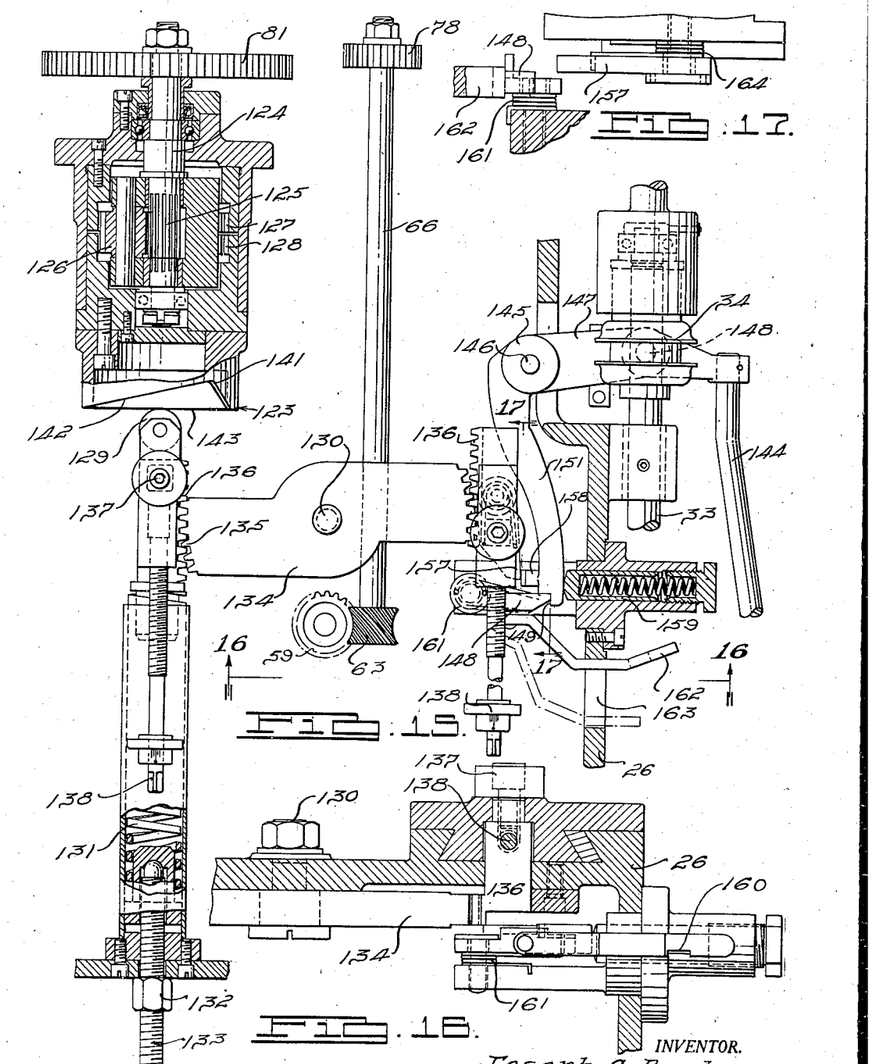
Fig. 15 is a view of structure partly in section employed for advancing the tools into the work and for controlling the operation of the machine.
Fig. 16 is an enlarged sectional view of the structure illustrated in Fig. 15, taken on the line 16—16 thereof.
Fig. 17 is an enlarged sectional view of the structure illustrated in Fig. 15, taken on the line 17—17 thereof.

For advancing the tools through the movement of the tool spindle housings 42 and the slide 84, I have provided a mechanism, illustrated in Figs. 15, 16 and 17, which automatically effects such advancement in opposite direction to feed the tools toward the work. It has been pointed out hereinbefore that the shaft 38 operates a gear 79 for driving a gear 81 and shaft 82. Through the operation of the shaft 82, the rotation of a cam 123 is effected. The gear 81 drives the shaft 82 supported in bearings 124. The shaft is provided with teeth 125 in mesh with a gear 126 which operates on two internal gears 127 and 128 one of which has one more or less teeth than the other so that during each revolution of the gear 126 the cam 123 will be advanced one tooth so that several hundred revolutions of the shaft 82 will be necessary to produce a single rotation of the cam 123. A cam following roller 129 engages the surface of the cam 123 against which it is biased by a spring 131 the tension of which may be regulated through the adjustment of a nut 132 on a screw 133. A double sector gear element 134 is supported on a center 130, having the teeth 135 at the ends, meshing with racks 136 disposed on each side thereof. The racks are secured to the slides 84 as illustrated in Fig. 3 by suitable clamping nuts 137. Lead screws 138 are provided on the racks 136 cooperating with the slides 84 in such manner that when the nuts 137 are loosened the screws 138 may be adjusted to position the slides 84 relative to each other and the center of the shaft 57, after which the nuts 137 are tightened.

The cam 123 is constructed to have the slides 84 retracted from the work when the roller 129 is in the lowermost portion 141 of the cam surface and to be fed into the work as the roller advances up the sloping surface 142. The slides 84 will be retained in this position as the roller rides over the dwell portion 143 of the cam. During the time the roller is contacting the sloping surface 142 the tools are fed into the work to desired depth. They are retained in this position as the roller rides on the surface 143, during which time the cutting edges of the tool are advanced to widen the gap initially formed, to produce accurate worm gear elements as will be explained more fully hereinafter.

The clutch 34 is of standard clutch plate type and unites the shaft 33 with the shaft of the gear 32 through the rearward movement of an operating rod 144. The rod is supported on a clutch operating bell crank 145 which is pivoted at 146 and has an arm 147 carrying clutch engaging pins 148 which operate the clutch. When the rod 144 is moved rearwardly, as illustrated in Fig. 3, the bell crank is rotated in a counter-clockwise direction permitting the detent 148 to engage a notch 149 in the end of the other arm 151 of the bell crank. In this manner the clutch is locked in engaged position and the machine will be driven through the gears 31 and 32. This operation will cause the rotation of the work and tools in predetermined synchronism and the operation of the cam 123 and the cam 98.

During the initial portion of the operating cycle the cam 98 engages the roller 105 on the dwell portion 106 and no advance movement of the worm 87 is effected thereby. During the time the cam 123 is advancing, the one rack 136, through the contact of the roller 129 with the sloping surface 142, operates through the gear sector 134 to drive the opposite rack 136 in the opposite direction to thereby cause the slides 84 to be advanced in opposite direction toward the work. In this manner, the tools are fed into the work until the proper depth of cut is obtained, to be retained in this position by the roller 129 in contact with the dwell surface 143 of the cam 123. At this time the cam roller 105 is engaged by the projecting surface of the cam 98 to cause the worm elements 87 to be shifted axially to thereby rotate the tool supporting shaft and tools, to cause the side feeding of the cutting edges. In the case of cutters for the worm one of the cutting tools will be rotated clockwise while the other one will be rotated counter-clockwise to thereby cut the opposite sides of the thread of the worm by widening the gap to desired dimensions and to produce true thread form. It will be noted that the tools are disposed in the opposite sense so that the same rotation of the tools produce the clockwise and counter-clockwise movements.

In the case of the hobs, however, the rotation of the tools is in the same direction since they are operating on opposite sides of the worm wheel. The advancement of the lead of the thread of the hobs caused by the increment of rotation will cause the side cutting, to widen the gap and produce true form. The right hand side of the tooth on one side of the worm wheel will be the left hand side on the opposite side so that it is necessary to cut on the right hand side of teeth on opposite sides of the worm wheel to cut on opposite sides of the teeth. For this reason it is necessary to rotate the hob shafts in opposite directions to have the cutting edges advanced in the same direction. This may be effected by reversing the mechanism illustrated in Fig. 6 changing it from one end to the other or by having the cam surface and dwell portion of the cam changed to have the side feeding effected on the lower portion of the cam surface.

Figures 12, 13, 14:
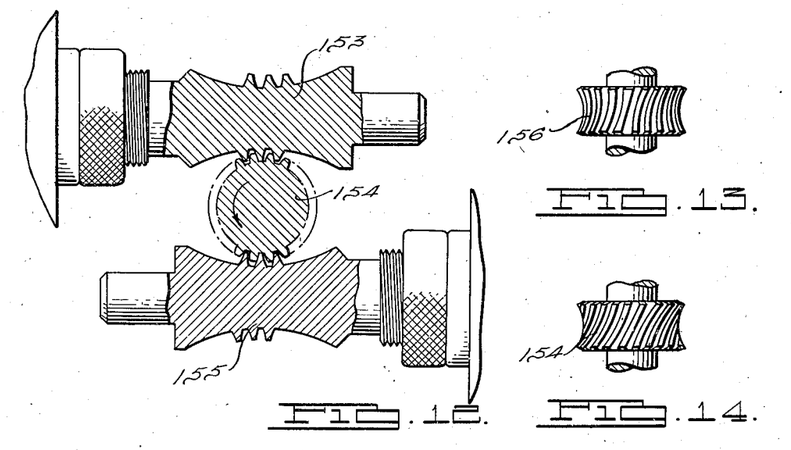
Fig. 12 is a sectional view of a worm wheel and two hobs in finishing relation.
Fig. 13 is a view in elevation of one form of worm wheel cut by the hobs.
Fig. 14 is a worm wheel, similar to that illustrated in Fig. 11, the teeth of which have a shorter lead.

The particular association of the hobs with the worm wheel is illustrated in Figs. 12, 13, and 14. In Fig. 12 it will be noted that a hob 153 on one side of the worm wheel 154 has been turned to advance the cutting edges in the side of the worm teeth toward the stem of the hob while the hob 155 on the opposite side of the worm wheel has been turned in the opposite direction to advance the cutting edges in the opposite side of the teeth toward the end of the hob opposite to the stem. The worm wheel is illustrated in Fig. 14 having a definite and appreciable helix angle or lead to the teeth, while in Fig. 13 a worm wheel 156 is illustrated wherein the teeth have a long or slow lead. This latter type of worm wheel is illustrated to show when the operation of the cam 98 may be omitted, as in the view of Fig. 10, where side feeding may be eliminated. This is due to the fact that the in-feeding of the cutting teeth, on a worm wheel where the teeth are substantially straight, the teeth are not deformed materially and sufficient surface contact will be provided without the side feeding. When the teeth, however, are disposed at a greater helix angle than that illustrated in Fig. 13, the side feeding will be necessary to compensate for the deforming of the sides by the in-feeding of the hob teeth.

After the side feeding of the tools, the roller 129 drops from the dwell portion 143 into the recess 141 to retract the rack elements 136 and the slides 84. During this retracting movement a second detent 157 engages the detent 148 to move it from the notch 149 in the arm 151 of the bell crank 145. After the detent 148 clears the notch 149, a projection 158 on the arm 151 moves the detent 157 out of contact with the detent 148 through the actuation of a spring pressed plunger 159. In this manner the detent 148 is again available to engage the notch 149 when the bell crank 145 is again rotated to engage the clutch 34. The detent 157 rides over the detent 148 during the advance movement of the slides 84 to be biased into the position illustrated, one to engage the detent 148 on the return movement of the slides 84, to cause the release of the clutch 34 and the stopping of the machine. The work element is then removed and new work elements inserted, after which the longitudinal movement of the rod 144 causes the arm 151 to rotate in a counter-clockwise direction and to be engaged by the detent 148 urged by the spring 161.

A projecting element 162 is provided on the detent 148 for the purpose of releasing it at any time so that the machine may be stopped within its cycle of operation. This projecting element extends through a slot 163 in the base 26 and is provided with a notch 160 which engages the frame and retains the detent out of engagement with the notch 149. It will be noted particularly in Figs. 15 and 17 that a spring 164 is provided for urging the detent 157 in a counter-clockwise direction.

Figures 18, 19, 20, 21, 22:
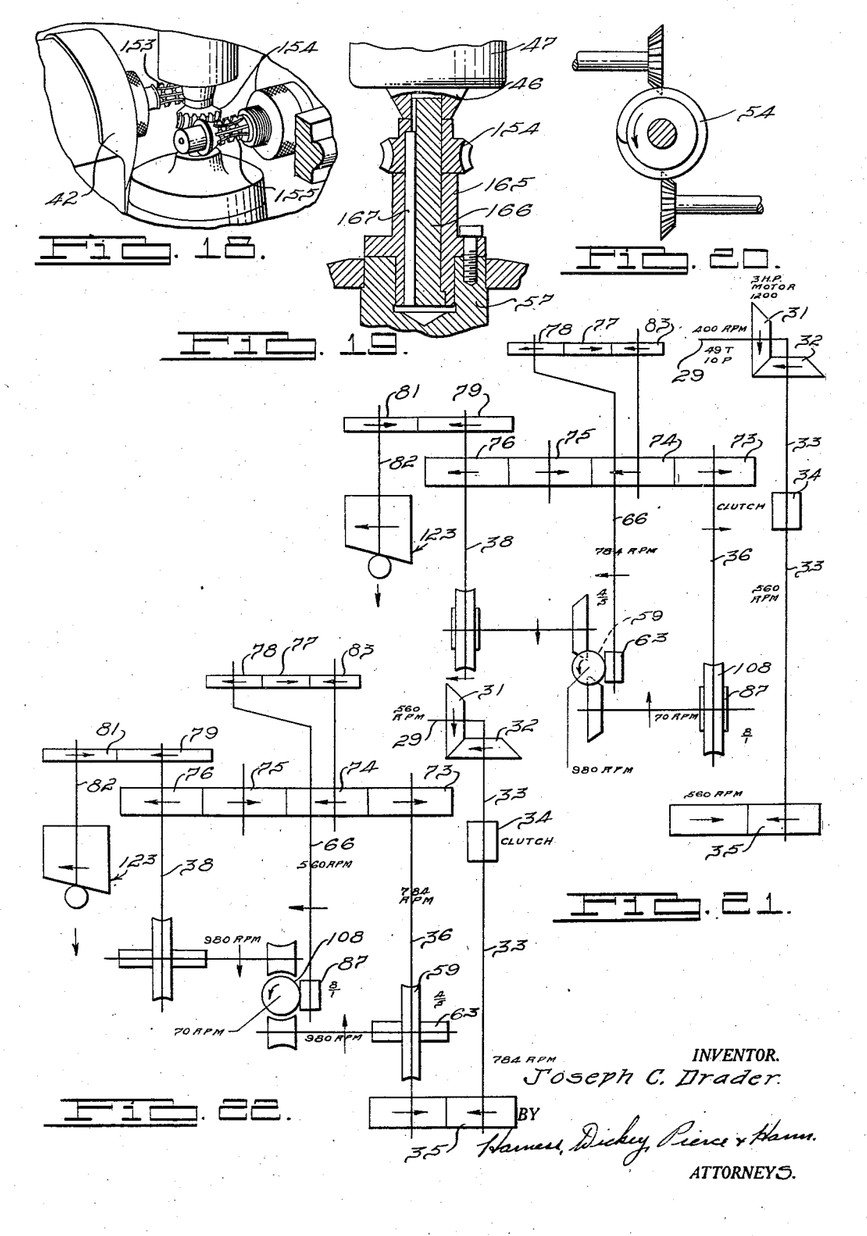
Fig. 18 is a perspective view of structure, similar to that illustrated in Fig. 2, showing the hobs and a worm wheel substituted for the cutters and worm.
Fig. 19 is an enlarged sectional view of a portion of the structure illustrated in Fig. 4, modified to support the worm wheel.
Fig. 20 is a plan view of the worm and cutters, showing their relation to each other.
Fig. 21 is a diagrammatic view of the gearing of the machine disclosing the operating and speed relation of the various gear elements for driving the cutters to produce worm elements.
Fig. 22 is a diagrammatic view of structure, similar to that illustrated in Fig. 21, but rearranged to produce the proper speed and driving relation between the worm wheel and hobs.

In Fig. 18 I have illustrated two hobs operating on a worm wheel employed in place of the cutting tools illustrated in Fig. 2 operating on the worm. In Fig. 9, it will be noted that the end of the work driving shaft 57 has had the worm-receiving end 45 removed and a flanged sleeve 165 substituted therefor. A slotted pin 166 is disposed within the sleeve 165 having a shouldered end engaged with an annular groove in the lower end of the sleeve. A key 167 retains the sleeve and pin in rotatable relation to each other. The pin 166 forms a shaft for receiving the worm wheel 154, the keyway in the worm wheel mating with the key 167 which forms a driving connection between the pin 166 and the worm wheel. The end 46 of the reciprocable element 47 is similar to that illustrated in Fig. 4 for engaging the end of the pin 166 and the worm wheel for steadying them and retarding alignment during the machining operation.

The operation of the machine for cutting worm wheels by the hobs is similar, except for speeds, to that above described relative to the worm and cutters. The relation of the cutters to the worm is illustrated in Fig. 20 where the cutters are fed toward each other until the depth of the slot is reached after which they are rotated to cut the sides of the slot to proper form and the slot to desired width. The worms and worm wheels cut in this manner have accurate mating surfaces which reduce wear and friction and provide long life to the elements.

In Figs. 21 and 22, I have illustrated diagrammatically the speed ratios of the elements to illustrate the novel feature of interchangeability of certain of the elements for producing the difference in speed ratios. In Fig. 21, I have illustrated the machine constructed to operate on a worm by a pair of cutting tools, while in Fig. 22 I have illustrated a pair of hobs operating on a worm wheel. The relative rotation of the cutters and elements are naturally reversed, in the present instance the worm and worm wheel have a ratio of 14 to 1, that is to say, the worm turns 14 times to the worm wheel's single operation. This same ratio obtains relative to the tools and the work elements. In other words, the cutting tools operating to produce the worm will rotate once during the time the worm makes 14 revolutions, while in the case of the hobs, the worm wheel will rotate once while the hob rotates 14 times. In the first instance the tool rotates slowly relative to the work while in the latter case the reverse is true.

The machines are geared up in such manner that the worm cutting tools and the worm wheel are rotated 70 revolutions per minute while the hobs and the worm are rotated 980 revolutions per minute. When cutting the worms, the pulleys and belt 28 are so related as to produce 400 revolutions per minute to the shaft 29, while in the case of cutting the worm wheels, the pulleys and belt 28 are such as to produce a speed to the shaft 29 of 560 revolutions per minute. Upon passing through the gears 31 and 32, the shafts 33 and 36, in the case of the worm, are driven at 560 revolutions while, in the case of the worm wheel, are driven 784 revolutions per minute. The worm elements 59 and 63 for driving the work and the elements 108 and 87 for driving the tool spindles have a 4 to 5 and 8 to 1 ratio, respectively, and are interchangeable as will be noted in the figures. In this manner, the relative speed of 70 and 980 revolutions per minute are provided to the tools and work in one instance and the work and tools in the other instance. Further timing for effecting the speed changes are obtained through the interchanging of the gears 83, 78 and 77 as illustrated in the figures. In this manner the number of different gears required for the two machines is materially reduced and very little change is required in one machine to produce one of the other type.

Substantially all of the gears, spindles, shafts, control mechanism, the base and frame are the same on both machines so that very little change is required to produce machines of either type. By employing two tools in the manner above described, the gap widening is effected by having each tool operate on a different side of the gap at the same time to produce true curved forms. The operation of the two tools on opposite sides of the work element balances the torque thereof, releases the strain on the tools and the work element and the driving and supporting elements of the machine. Since the worm elements always are revolved at a particular speed relative to each other, the gear ratio set up for one machine may apply, in the manner as illustrated in Figs. 21 and 22, to the other and thereby eliminate different structures and layouts for the two machines. The renewal of parts required by the machines is materially reduced and the machine is extremely simplified.

While I have described and illustrated but a single embodiment of my invention, it will be apparent to those skilled in the art that various changes, omissions, additions and substitutions may be made therein without departing from the spirit and scope of my invention as set forth in the accompanying claims.

I claim as my invention:

1. A machine for cutting worm elements provided with a work spindle for driving a worm element, two tools disposed in spaced relation about the element and having cutting edges narrower than full mating width, means for moving said tools radially toward the element during the machining operation to cut a gap therein to proper depth, and means for thereafter side feeding the cutting edges of the tools so that said edges cut on respectively opposite sides of the gap to widen the gap.

2. A machine for accurately cutting worm elements which includes, in combination, means for supporting and driving a worm element, means for supporting and rotating two tools in spaced relation about the worm element, said tools having cutting edges narrower than full mating width, means for radially advancing said tools into the worm element during a machining operation to cut a gap of predetermined depth therein, and means for thereafter simultaneously side feeding the cutting edges of the tools so that said edges cut on respectively opposite sides of the gap to widen the gap initially cut.

3. A machine for accurately cutting worm elements which includes, in combination, means for supporting and driving a worm element, means for supporting and rotating two tools in spaced relation about the worm element, said tools having cutting edges narrower than full mating width, means for advancing said tools into the worm radially of the worm element during the machining operation to cut the proper depth of gap in the worm element, means for thereafter side feeding the cutting edges of the tools so that said edges cut on respectively opposite sides of the gap by simultaneously cutting away the opposite sides of the worm element thread to produce true curved forms, and means controlled in accordance with said side feeding action for thereafter withdrawing the tools from the worm element and stopping the machine.

4. A machine for cutting threads in one element of a worm couple of the enveloping type, comprising a spindle for rotatably supporting said one element, a plurality of cutting tools of a form corresponding to that of the other element of said couple but having teeth of narrower width than required for full mating contact with the threads on said one element when finished, a pair of tool spindles arranged to support said tools relative to said one element in positions radially spaced from but otherwise corresponding to positions of said other element when coupled with said one element and with the individual tools in spaced relation circumferentially of said one element, means for driving said worm element and tool spindles in rotation at rates corresponding to mating rates of said elements of said couple, means effective during said rotation for feeding said tool spindles radially toward said one element to positions of center distance spacing from said one element corresponding to proper center distance spacing between said elements of said couple to cause said tools to form gaps in said one element of full depth and having angularly extending sides, and means for thereafter actuating said tool spindles to effect a side feed movement of the teeth of the associated tools so that one tool widens the gaps at one side thereof and changes the angular relation of said one side and so that the other tool widens the gaps at the other side thereof and correspondingly changes the angular relation of said other side.

5. A machine for cutting threads in one element of a worm couple of the enveloping type, comprising a spindle for rotatably supporting said one element, a plurality of cutting tools of a form corresponding to that of the other element of said couple but having teeth of narrower width than required for full mating contact with the threads on said one element when finished, a pair of tool spindles arranged to support said tools relative to said one element in positions radially spaced from but otherwise corresponding to positions of said other element when coupled with said one element and with the individual tools in diametrically opposed relation relative to said one element, means for driving said worm element and tool spindles in rotation at rates corresponding to mating rates of said elements of said couple, means effective during said rotation for feeding said tool spindles radially toward said one element to positions of center distance spacing from said one element corresponding to proper center distance spacing between said elements of said couple to cause said tools to form gaps in said one element of full depth and having angularly extending sides, and means for thereafter actuating said tool spindles to effect a side feed movement of the teeth of the associated tools so that one tool widens the gaps at one side thereof, and changes the angular relation of said one side and so that the other tool widens the gaps at the other side thereof and correspondingly changes the angular relation of said other side.

6. A machine for cutting threads in one element of a worm couple of the enveloping type, comprising a spindle for rotatably supporting said one element, a plurality of cutting tools of a form corresponding to that of the other element of said couple but having teeth of narrower width than required for full mating contact with the threads on said one element when finished, a pair of tool spindles arranged to support said tools relative to said one element in positions radially spaced from but otherwise corresponding to positions of said other element when coupled with said one element and with the individual tools in spaced relation circumferentially of said one element, means for driving said worm element and tool spindles in rotation at rates corresponding to mating rates of said elements of said couple, means effective during said rotation for feeding said tool spindles radially toward said one element to positions of center distance spacing from said one element corresponding to proper center distance spacing between said elements of said couple to cause said tools to form gaps in said one element of full depth and having angularly extending sides, and means actuated by said driving means and rendered effective at the conclusion of said radial feed movement for actuating said tool spindles to effect a side feed movement of the teeth of the associated tools so that one tool widens the gaps at one side thereof and changes the angular relation of said one side and so that the other tool widens the gaps at the other side thereof and correspondingly changes the angular relation of said other side,

JOSEPH C. DRADER.